March 9, 1943.  A. TANGEN  2,313,679
POWER TAKE-OFF MECHANISM
Filed June 25, 1942  4 Sheets-Sheet 1

Inventor
Anthony Tangen
By John C. Alexander
Attorney.

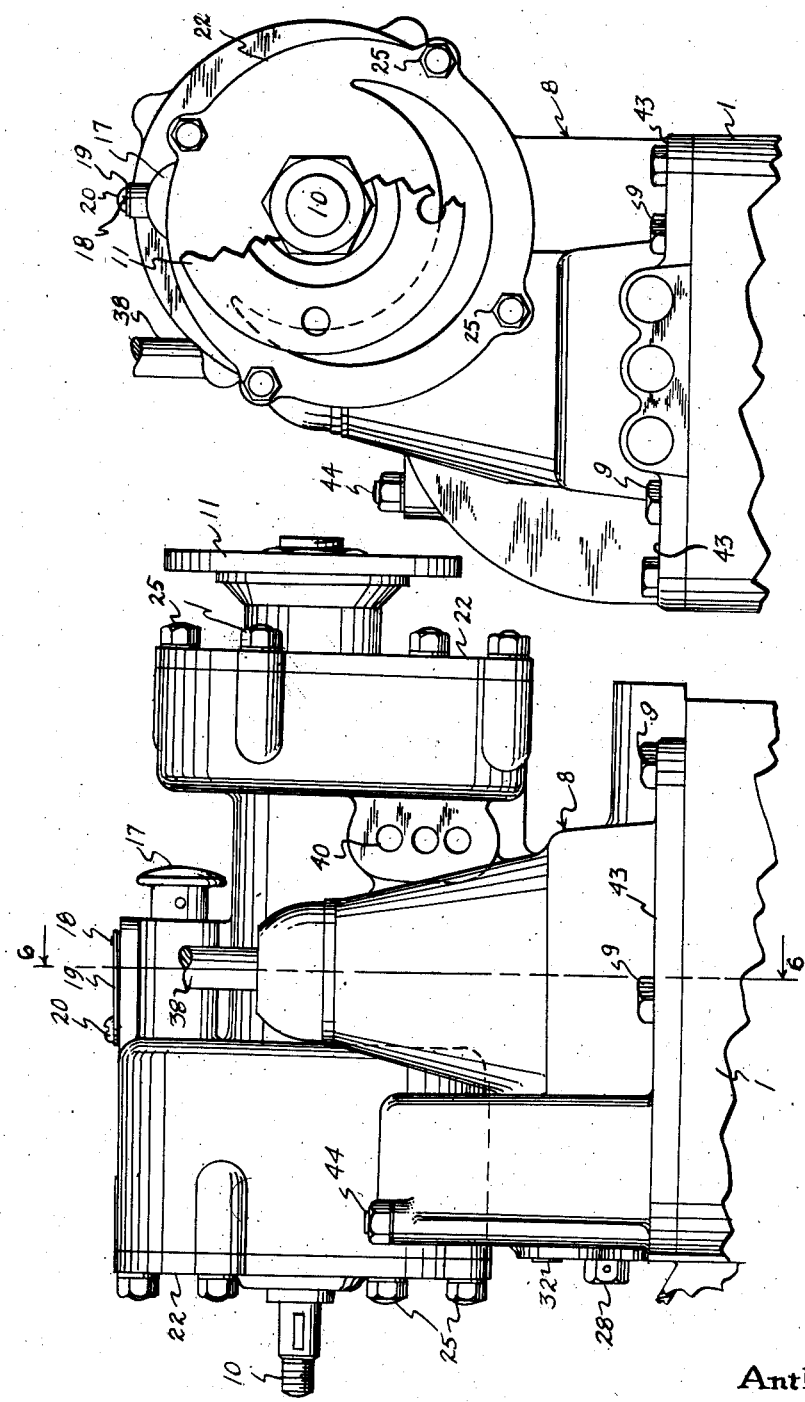

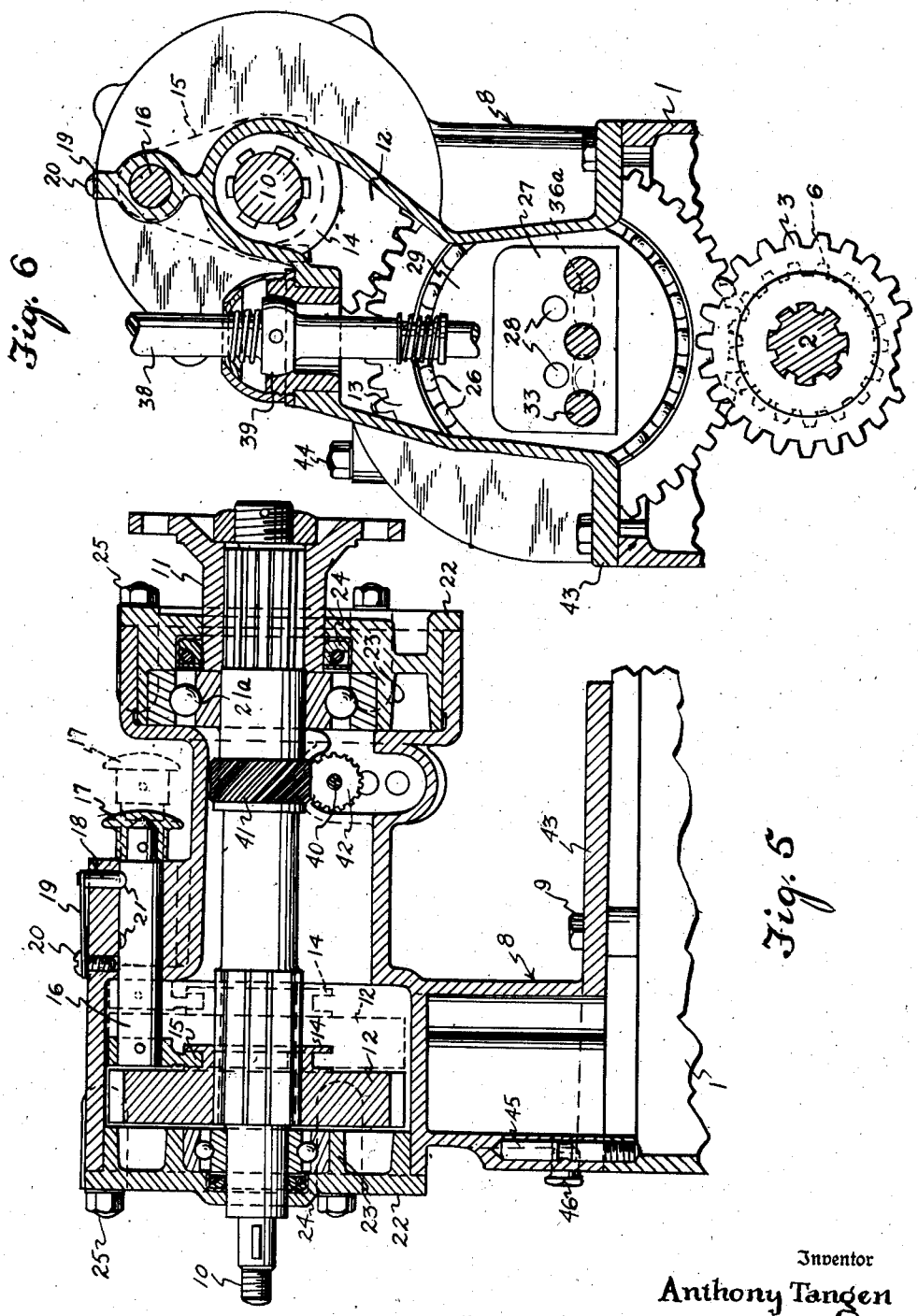

Patented Mar. 9, 1943

2,313,679

UNITED STATES PATENT OFFICE 2,313,679

POWER TAKE-OFF MECHANISM

Anthony Tangen, Detroit, Mich.

Application June 25, 1942, Serial No. 448,371

4 Claims. (Cl. 74—11)

This invention relates to power take-off mechanisms such as adapt power plants of motor vehicles for drive purposes additional to vehicle propulsion.

An object of the invention is to install a power take-off mechanism in a housing suited to replace the usual cover for the transmission gear casing of a vehicle, said mechanism comprising a train of gears and adapting one thereof to mesh with and be driven by a gear of the transmission, and further comprising an improved provision for making or breaking the drive connection to said shaft.

Another object is to provide in an improved and simplified manner for using several different gear ratios in driving the power take-off shaft, whereby field of utility of the mechanism is increased.

A further object is to employ a ring type of idler gear to establish a drive from a vehicle transmission gear to a power take-off shaft, and to journal such gear on a mounting serving also as a support for the front ends of the transmission shifter rods, and additionally carrying latches for holding said rods in their selective adjustments.

These and various other objects are attained by the construction hereinafter described and illustrated in the accompanying drawings, wherein:

Fig. 3 is a side elevational view of the mechanism.

Fig. 4 is a rear end view thereof.

Fig. 5 is a longitudinal vertical sectional view, taken on line 5—5 of Fig. 2.

Fig. 6 is a cross sectional view taken on the line 6—6 of Fig. 3.

Figures 1, 2:
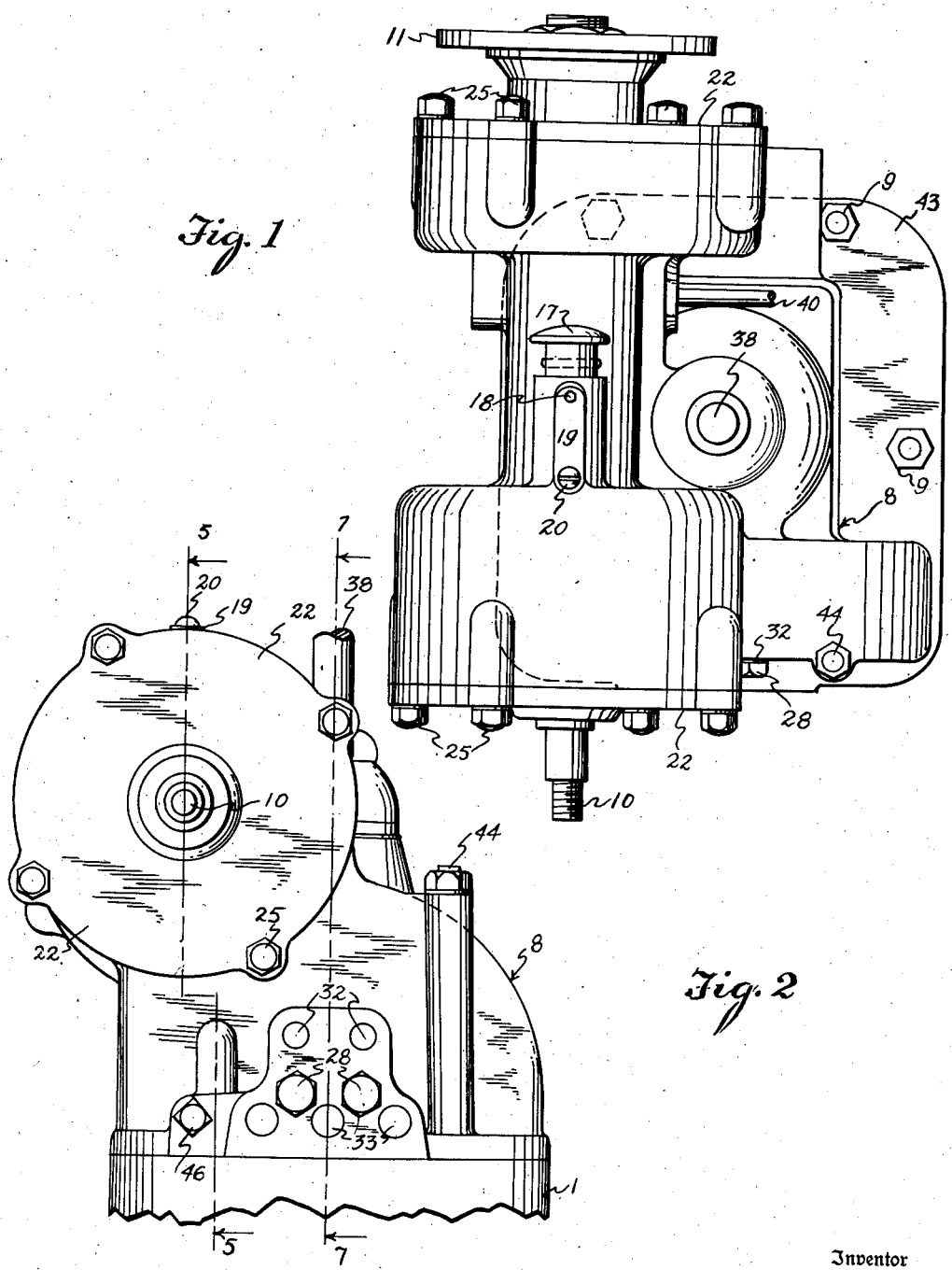
Fig. 1 is a top plan view of the improved power take-off mechanism.
Fig. 2 is a front end view of the same.
Figure 7:
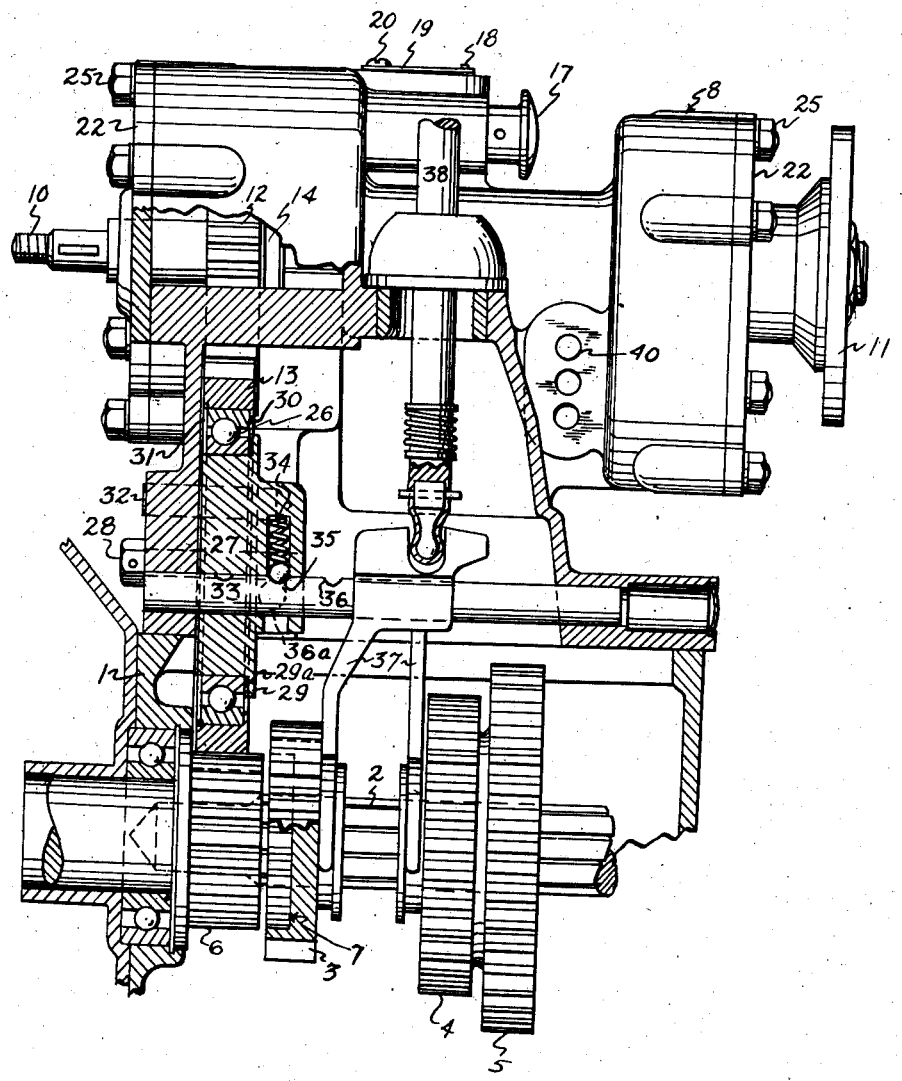
Fig. 7 is a longitudinal vertical sectional view taken on the line 7—7 of Fig. 2.

In these views, the reference character 1 designates the casing of the standard transmission of a motor vehicle, 2 the main transmission shaft, 3, 4, and 5 gears slidably splined on said shaft, and 6 a pinion serving as a journal bearing for the front end of said shaft, and engageable by internal clutch teeth 7 formed on the gear 3 to establish a drive to said shaft.

For power take-off purposes, I install on the casing 1 a housing 8 replacing the standard casing cover (not shown), bolting the housing to the casing as indicated at 9. The same tapped openings used for fastening on the standard cover serve for engagement by the bolts 9. In the top portion of the housing 8 is journaled the power take-off shaft 10, the end portions of which project from the housing, the rear end portion being splined to mount a coupling member 11 for transmitting a drive. Within front portion of the housing 8 the shaft 10 is splined to mount a sliding gear 12, which in a forward position thereof meshes with an idler gear 13 and which may be retracted, as shown in dash lines in Fig. 5, to clear the idler gear. An annularly grooved collar 14 carried by the gear 12 is engaged by a shifter fork 15 fixed on a plunger 16 slidable in the housing and equipped exteriorly of the latter with an actuating knob 17. For holding the plunger in either of its effective positions, a detent pin 18 is socketed in the housing to bear on the plunger under pressure of a finger spring 19 on one end of which said pin is mounted, the spring seating downwardly upon the housing and having its other end secured by a screw 20. The plunger is formed with recesses 21 alternatively receiving the detent pin according as the plunger is in one or the other of its effective positions.

The shaft 10 is journaled in anti-friction bearings 21a, preferably of a ball type, mounted in closure plates 22 for openings affording access to the housing at its front and rear ends, said plates being apertured to permit the shaft to extend therethrough. Said plates have annular portions 23 projecting into the housing to receive the bearings 21a and to further receive oil seals 24, preventing escape of lubricant along the shaft 10. The plates 22 are rigidly secured to the housing by bolts 25.

The idler gear 13 establishes a drive from the transmission gearing to the gear 12, being journaled within the housing 8 in permanent mesh with the pinion 6 and meshing with the gear 12 in forward position of the latter. The idler gear is of a ring type journaled through anti-friction elements 26 on a mounting 27 clamped against the front wall of the housing by a pair of bolts 28. The anti-friction elements and their race rings are held in place on the mounting 27 between the front wall of the housing and an annular flange 29 on said mounting, a spacer ring 29a being interposed between said flange and the adjacent race ring. The idler gear is interiorly formed, adjacent one of its lateral faces, with an annular flange 30 and retains a split wire snap ring 31 adjacent to its other lateral face, being thus restrained from lateral shifting with respect to its anti-friction journal means. A pair of dowel pins 32 accurately position the mounting 27 with respect to the front wall of the housing, and hence accurately locate the idler gear so that it may properly mesh with the gear 12 and 6.

Three shifter rods 33, originally installed on standard transmission cover eliminated by my mechanism, are carried by the housing 8 in proper relation to the transmission. Such location of said rods is made possible by using the mounting 27 to support the front end of the rods, said mounting being formed with vertical sockets above the shifter rods receiving coiled springs 34 and ball type latches 35 for engaging the usual notches 36 of said rods and holding them in their selective positions. Also the mounting 27 carries latch members 36a disposed between the shifter rods and coacting with them in a well-known manner to prevent concurrent actuation of more than one of the rods. Secured on the rods 33 are the usual shifter forks 37, operative selectively in the usual manner from the lower end of a gear shift lever 38, universally pivoted at 39 upon the housing.

By substituting other gears 12 smaller than that illustrated and correspondingly shifting the shaft 10 toward the idler gear, a selection of speeds for said shaft is obtainable. The housing is designed to permit shifting of the shaft 10 as described, as particularly appears by reference to Fig. 6, and removal of the front closure plate 22 permits selective installation of gears 12 differing in size. The rear closure plate is accommodated to two predetermined positions of the shaft 10 by reason of the eccentric location of the opening for said shaft and of the annular portion 23 carrying the anti-friction journal elements and lubricant seal, one of said positions being shown in the drawings and the other being established by rotating said rear plate through one hundred and eighty degrees. To accommodate said shaft in any other desired change-speed positions, substitute rear closure plates (not shown) are provided, and a front closure plate additional to that shown is provided for each additional change-speed position of said shaft. It is of course to be understood that any downward shifting of the shaft 10 from its illustrated position entails use of a longer shifter fork than that illustrated.

For various purposes it may be desirable to provide an accurate indication of the speed at which the shaft 10 is driven. To afford such indication it is preferred to journal a speedometer shaft 40 in the housing 8 below and transversely to the shaft 10. A spiral gear 41 on the shaft 10 meshes with a spiral gear 42 on the shaft 40, and the latter may be installed at different levels to adapt itself to such different positions as may be afforded the shaft 10.

One of the difficulties encountered in adapting the housing 8 to replace a cover originally applied to the casing 1 lies in attaching the housing to the casing by bolts that will engage the casing bolt holes originally provided. Bolts 9 heretofore mentioned are readily applicable to the rear end portion and middle portion of the housing, such portions having a marginal flange 43 for engagement by said bolts. To fasten down the front end of the housing 8 it is necessary to employ two special stud bolts 44 and 45, the bolt 44 being sufficiently long to extend through an embossed portion of the front wall of the housing and to be engaged by a nut superposed on the housing. The bolt 45 cannot be made accessible for applying a nut thereto and is made effective by installing in the front wall of the housing a set screw 46 having a tapered rear end that locks into an annular groove of the bolt 45.

Another considerable difficulty solved by the invention is that of installing the shifter rods and their latches in their operative location without mutual interference between said rods and the idler gear 13. By giving such gear a ring form and journaling it on a mounting of sufficient size to adequately support front ends of all three shifter rods, and to further carry the latches for said rods, this problem is solved in a practical manner.

It is a vital feature of the invention that the housing 8 is designed to afford room for materially shifting the power take-off to and from the idler gear, since such shifting is entailed in establishing different preselective gear ratios to obtain a selection of speeds for said shaft. Adaptation of the mechanism to apply preselective speeds to the power take-off shaft adds materially to the useful field of such mechanism.

What I claim is:

1. In a power take-off mechanism, the combination with a selective speed gear transmission and its casing, of a housing surmounting and closing the top of said casing, a power take-off shaft journaled in and projecting from said housing, a driven gear on said shaft in driving engagement therewith, an annular idler gear transmitting a drive to the driven gear from said transmission, a journal member for the idler gear rigidly carried by and within said housing, and a plurality of shifter rods for shifting gears of said transmission, having end portions slidably mounted in said journal member.

2. In a power take-off mechanism as set forth in claim 1, a latch coacting with each shifter rod and mounted in said journal member.

3. In a power take-off mechanism as set forth in claim 1, a set of anti-friction elements mounting the idler gear on said journal member.

4. In a power take-off mechanism as set forth in claim 1, the journal member being upwardly inserted in said housing, a plurality of bolts extending through a wall of the housing and clamping the journal member to said wall.

ANTHONY TANGEN.